Nov. 22, 1960

R. W. BOGLE 2,961,653

RADIO RANGING DEVICES

Filed Dec. 16, 1948

WITNESSES:

INVENTOR:
Robert W. Bogle
BY 2,961,653
Patented Nov. 22, 1960

2,961,653

RADIO RANGING DEVICES

Robert W. Bogle, Silver Spring, Md., assignor to the United States of America as represented by the United States Atomic Energy Commission Filed Dec. 16, 1948, Ser. No. 65,694

10 Claims. (Cl. 343—13)

This invention relates broadly to a method and apparatus for effecting operations on a vehicle as a consequence of the approach to a selected intervening distance from another body. More particularly, it is directed to radio apparatus adapted to be carried on a vehicle for initiating a desired sequence of operations when the intervening space between the vehicle and a reflecting body is reduced to a selected value. It is highly desirable in the operation of certain types of moving vehicles, such as aircraft for instance, that means be provided whereby the occurrence of a pre-selected value of proximity to the surface of the earth or other foreign body effects the actuation of warning lights or steering modifying apparatus. Other vehicles in which the provision of such equipment is desirable to avoid collision are, for example, trains, ships and automobiles, in order that warning devices, reversed propulsion or brakes will be applied in the event that the vehicle approaches within a selected minimum distance of an object.

More particularly, there are certain vehicles, such as projectiles, in which the provision of apparatus for initiating a sequence of operations upon the occurrence of a pre-selected value of proximity to another body is a necessity. For instance, certain types of free-falling projectiles containing explosive material are most effective if detonated at a pre-determined distance above the objective.

The provision of apparatus for performing the above function on a vehicle is subject to certain requirements. The apparatus must possess accuracy, high sensitivity, compactness, lightness in weight and the ability to range at short distances.

It has been found that the super-regenerative circuit possesses particularly favorable characteristics for meeting the above requirements. Systems utilizing such a circuit have been disclosed in copending applications Serial No. 65,695, filed December 16, 1948, now abandoned, Serial No. 65,696, filed December 16, 1948; and Serial No. 65,692, filed December 16, 1948, of which this application is a continuation-in-part. The referenced applications disclose ranging devices which utilize a peculiar characteristic of the super-regenerative circuit for sensing the occurrence of the selected range.

This characteristic is the generation of noise under free-running conditions and the disappearance of noise generation under the condition that externally derived excitation of proper phase is impressed upon the circuit.

The behavior of the super-regenerative circuit or oscillator in the aforementioned manner may be understood from a brief consideration of operating conditions in the device.

The super-regenerative oscillator is an oscillatory circuit including a thermionic tube and a resonant circuit. In the self-quenching super-regenerative circuit, the tube is provided with a grid leak of such high value that the grid bias accumulated under oscillating conditions causes blocking after an interval of oscillation. The externally quenched super-regenerative circuit acts in a somewhat similar manner except that the termination of each oscillation is more precisely determined by the negative excursions of the quench wave.

After the tube is blocked and oscillations in the resonant circuit have collapsed, there is an interval of inaction during which the blocking bias on the grid is dissipated through the grid leak. After the grid bias has recovered to a value at which the building up of oscillations is again possible, the oscillations will begin, but only when the resonant circuit is given a small start. The small start may consist of either externally created thermal noise or excitation of proper phase from without. If there is no excitation from without the circuit and the thermal noise starts the circuit, there results a slight indefiniteness in the instant of the beginning of each successive operation. It follows that under this condition, the birth of succeeding groups of oscillations are not evenly spaced with respect to time and also that the groups of oscillations are of irregular duration.

These phenomena are utilized by the provision of a filter adapted to pass energy corresponding to the irregularities and a rectifier for converting the irregularities into a unidirectional potential. Upon the impression on the circuit of excitation of a character adapted to start the oscillations at uniform intervals, the unidirectional potential decreases or disappears and the decrease or disappearance of the potential is utilized as a controlling influence on appropriate indicating devices.

Externally derived excitation for starting each successive oscillation may be derived by directing energy from each preceding oscillation through a path having a length such that some of the energy is returned to the circuit at the proper instant to control a succeeding oscillation.

It follows that under the condition that the super-regenerative oscillator is provided with radiating and receiving means, it is capable of indicating the occurrence of that distance between itself and a reflecting object which so phases the received echo of energy of each emitted oscillation that the intervals between oscillations become uniform.

A ranging device of the present type preferably utilizes the oscillation sequence described in the above referenced copending application Serial Number 65,696 in which a radiation oscillation, hereinafter termed the sending oscillation, is followed by a sensing oscillation with an intervening ranging interval equal to twice the selected range divided by the velocity of light. Pairs of oscillations so created are repeated with intervening time separations of about 15 to 30 times longer than the ranging interval. The purpose of this sequence is the elimination of possible ambiguities arising from noise dips occuring at regular multiples of the basic range such as would be obtained from an evenly pulsed system. In such a system, the first oscillation of each pair is utilized for the purpose of radiating energy toward a reflecting body, and at the selected range, the energy so radiated is received at the time of the occurrence of the second oscillation of each pair.

The receipt of the radiated energy in this manner suppresses the noise generation of the sensing oscillation. The noise generated by the sending oscillation is not suppressed on ranging, and to the end, that the unsuppressed noise created by the sending oscilaltion will not obscure the decrease in noise generation by the sensing oscillator or upon the occurrence of the on-range condition, it is desirable to provide means whereby the noise of the sending oscillation will not affect the indicating components of the ranging device. In the referenced application Serial Number 65,696, elimination of noise generation by the sending pulses is accomplished by an auxiliary high frequency oscillator which impresses a control wave on the super-regenerative oscillator only during the sending pulses. This system, although useful and practical, suffers from the difficulty involved in making adjustments in the radio frequency elements at high frequencies.

Another system for the elimination of noise generated by the sending pulse is presented in the above referenced copending application Serial Number 65,692. The system therein disclosed utilizes a gating circuit which is inserted between the oscillator and the detecting components. This gating circuit decouples the detecting components during the sending oscillation.

The present invention is directed to a simplified arrangement in which the necessity for a gating device or auxiliary noise suppression oscillator is avoided. To this end, two super-regenerative oscillators are provided. One oscillator is activated for a short duration to thereby create a sending oscillation. The second oscillator is activated after a short duration equal to the ranging interval to "listen" for echoes of the sending oscillation. Both oscillators are provided with antennas whereby an echo of energy radiated by the sending oscillator, if received in proper phase by the second oscillator, suppresses the noise generation thereof and thereby effects the indication of the occurrence of the selected range.

A ranging device constructed in accordance with the principles presented herein is capable of indicating a wide range of ranging distances by the expedient of providing adjustability in the time interval between sending and sensing oscillations, and in the duration of the sending oscillations.

It is, therefore, an object of this invention to provide a simplified radio ranging device for indicating a selected range.

Another object is the utilization of a super-regenerative circuit for ranging.

It is still another object of this invention to provide a ranging device which indicates the occurrence of a selected intervening separation between the device and a relatively moving object, and in which the value of separation at which indication occurs can be modified at will.

Another object of the invention is the simplification of apparatus in a ranging device by the utilization of one super-regenerative oscillator for sending and a second super-regenerative oscillator for detecting.

Another object of this invention is the provision of means in a light weight ranging device for effecting selected operations in response to the diminution of intervening distance to a pre-selected value between the device and a foreign body.

Another object is the provision of a ranging device which is capable of indicating the occurrence of a short distance between itself and an object.

Still another object of this invention is the provision of super-regenerative apparatus for generating an electrical quantity by the occurrence of a selected intervening distance between the apparatus and an approaching body.

Still another object is the provision of switching means for energizing an indicator or for initiating desired operations in response to the electrical quantity generated by the super-regenerative apparatus when the intervening distance between the device and a foreign body is a selected value.

Another object is the provision of modulating means for activating sending and receiving super-regenerative oscillators in sequence with an adjustable time interval therebetween.

Further objects and features of the invention will become apparent to those skilled in the art upon reference to the accompanying specification, claims and drawings in which:

Figure 1:
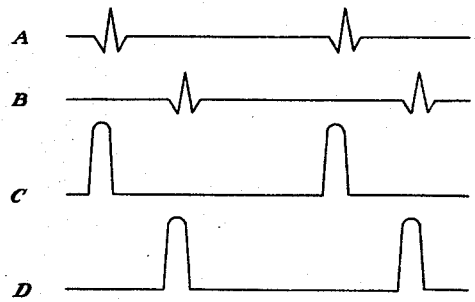
Figure 1 shows a desired mode of oscillation in the sending and receiving super-regenerative oscillators and the modulator activating pulses for effecting the same.

Referring to Figure 1, chart A, a preferred sequence of oscillation periods of the sending super-regenerative oscillator is shown. These oscillations are controlled by the modulation pulses shown in Figure 1, chart C. Figure 1, chart B shows the oscillation periods of the receiving super-regenerative oscillator. These oscillations are controlled by the modulation pulses shown in Figure 1, chart D. The receiving oscillations are spaced in time from the sending oscillations by the time spacing of the modulator pulses which is equal to twice the selected ranging distance divided by the velocity of light. Each sending oscillation is followed by a receiving oscillation after which a quiescent interval having a length in the neighborhood of 15 to 30 times the ranging interval transpires before the occurrence of succeeding pairs of sending and receiving oscillations. The sending and receiving oscillators are activated at the appropriate intervals by modulator pulses shown in Figure 1, charts C and D respectively.

Figure 2:
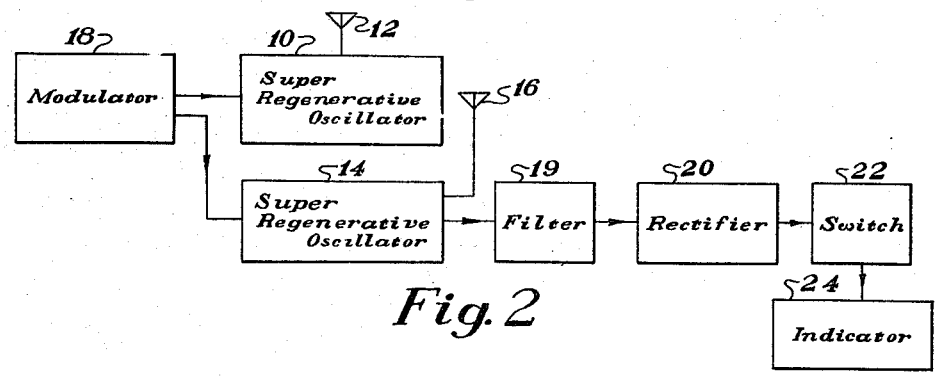
Figure 2 is a block diagram showing the coordination of components of a ranging device constructed according to the present invention.

Figure 2 is now referred to for an explanation of apparatus components organized to achieve the objectives of the present invention. The super-regenerative sending oscillator 10 is provided with an antenna 12 so that wave energy of a selected working frequency is radiated during the periods of activation thereof. The super-regenerative sensing oscillator 14 is tuned to the selected working frequency and is provided with an antenna 16 whereby it is adapted to receive reflections of wave energy transmitted by the sending oscillator. Pulses for activating the super-regenerative oscillator and detector-oscillator in proper alternate sequence are generated by modulator 18.

The output of the sensing oscillator is passed through filter 19 to eliminate energy of quench and microphonic frequencies and the resultant noise energy is rectified in rectifier 20 and is impressed on potential responsive switch 22 which in turn controls indicator 24.

Figure 4:
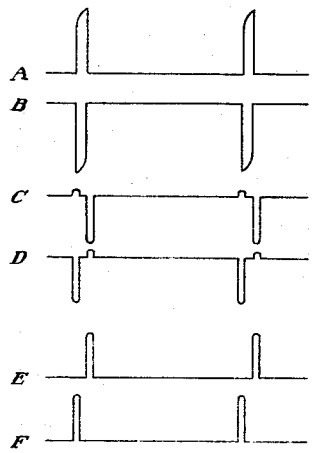
Figure 4 shows the pulses developed in certain circuit components in the evolution of the modulation pulses shown in Figure 1.
Figure 3:
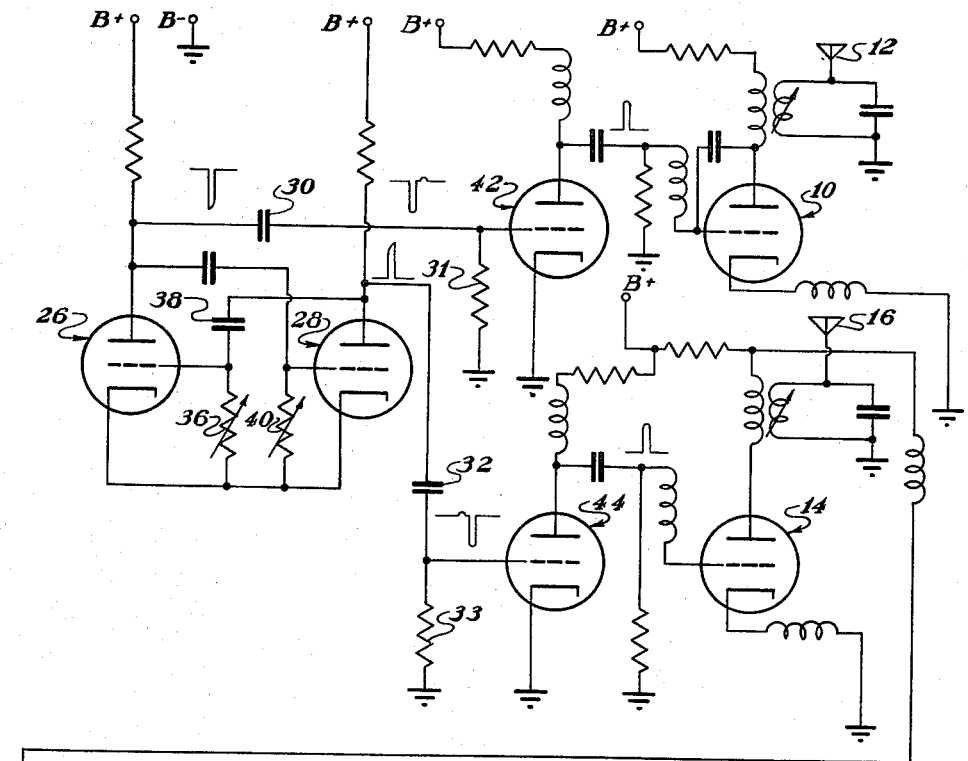
Figure 3 is a circuit diagram of the apparatus of the present invention.

The apparatus in the various components of the ranging device are now explained in detail with reference to Figure 3. A conventional multi-vibrator comprising tubes 26 and 28 is used to generate approximately rectangular pulses of the type shown in Figure 4, charts A and B. It is assumed for purposes of explanation that the pulses shown in Figure 4, chart A are generated at the anode of tube 28, and that the pulses shown in Figure 4, chart B are generated at the anode of tube 26. The pulses generated by tube 26 are confined to a first channel including a differentiating network comprising condenser 30 and resistor 31. The pulses generated by tube 28 are confined to a second channel including a differentiating network comprising condenser 32 and resistor 33. The differentiated pulses from tubes 28 and 26 take the shape shown in Figure 4, charts C and D respectively. The differentiation of the pulses results in two sharp pulses occurring at the time of the leading and trailing edges of each of the rectangular multi-vibrator pulses. Because of a slight "rounding" of the positive swing of each rectangular pulse, the positive differentiated pulse has less amplitude than the negative.

As both sides of the multi-vibrator are used, it is seen that the higher amplitude negative pulses shown in chart D in the first channel precedes the similar pulse shown in chart C in the second channel by the time interval represented by the multi-vibrator pulse width. This pulse width is determined mainly by grid leak resistor 36 and coupling condenser 38 in one side of the multivibrator. Resistor 36 is made variable and thereby provides a simple control of the pulse interval, and thereby the ranging distance. It is noted at this point that the adjustment of grid leak resistor 36 causes a slight change in the repetition rate as well as the pulse interval. This change alters the total noise output to a slight extent. This effect can be eliminated by providing adjustability in the alternate grid leak resistor 40. Suitable ganging between the two variable resistors permits the ranging distance to be varied over a wide range without alteration in the repetition rate.

The sharp differentiated negative pulses derived from each of the differentiating networks are impressed on thermionic tubes 42 and 44 which serve the double role of pulse sharpeners, inverters and modulators.

Each of tubes 42 and 44 inverts and amplifies the negative pulse in its respective channel and impresses the positive pulse derived therefrom on the respective super-regenerative oscillators 10 and 14 to activate the same.

It follows that the sending oscillator is caused to transmit energy each time it is activated by a positive pulse corresponding to the leading edge of the multivibrator short pulse, and the sensing oscillator is activated by a positive pulse corresponding to the trailing edge of the multi-vibrator short pulse. It follows that the ranging interval is equal approximately to the multivibrator short pulse duration.

The minimum distance to which the ranging device can respond depends upon the Q of the transmitter oscillator. The reason for this is as follows: The shortest distance at which the device can respond to give an on-range indication is limited by the closeness in time in which a receiver oscillation can follow the occurrence of a sending oscillation without being triggered directly by the sending oscillation. In other words, energy must not be radiated by the sending oscillator when the sensing oscillator is activated. The length of the sending oscillation can be reduced by reducing the length of the activating modulator pulse to the shortest interval which will allow the sending oscillation to emit sufficient radiation. The activating pulse can be very short for ranging at short distances. However, the sending oscillatory circuit continues to oscillate, that is, to ring and emit energy after the termination of the activating pulse. The length of time is ringing depends on the Q of the circuit. The more the circuit is damped, the shorter the ring time and the shorter the distance the device can range. The Q of the circuit can be reduced by the insertion of resistance in the oscillatory circuit and by proper loading with the antenna, and to this end, the antenna 12 is adjustably coupled to the sending oscillatory circuit. For a more detailed analysis of this aspect of the super-regenerative ranging device, the subject matter pertinent thereto presented in referenced copending application Serial Number 65,695 is incorporated herein by reference.

The output of the sensing oscillator contains in addition to the ranging noise energy, extraneous energy of modulation and microphonic frequencies. To the end that the on-range reduction in noise generation is not obscured by such extraneous energy, a filter 19 is provided to pass only the noise energy. The filtered noise energy is amplified in a tube 52 which is so biassed that the peaks of the input noise energy exceed the linear characteristic operation of the tube. This operation in the saturation region provides a limiting effect which eliminates noise energy amplitude variation effects which may occur as the result of changes in the amount of energy radiated by the sending oscillator or changes in reflection coefficient of reflecting objects.

The output of the noise amplifier is rectified by rectifier 20 in such manner that the rectified noise energy impresses a positive bias on amplifier tube 54.

Upon the entrance of the moving ranging device into an on-range region, the unidirectional potential created by rectifier 20 decreases upon the initial occurrence of the on-range condition, decreases to a minimum or zero within the region of the on-range condition, and then increases as the device moves out of the on-range condition. Thus the rate of change of the unidirectional potential has a half cycle period which depends mainly on the length of the sending oscillation and the velocity with which the device moves through the on-range region.

Therefore, to insure the obtainment of an indication due only to the time rate of change of noise generation, it is desirable to provide a low pass filter comprising in the main, resistor 58 and condenser 60. This filter is designed to pass a time rate of change in the unidirectional potential having a frequency F equal to $$2\frac{N_d}{V_d}$$

where $N_d$ is the length of the region within which a noise dip occurs and $V_d$ is the velocity with which the ranging device moves relative to the reflecting object. For example, if the noise dip extends for 300 feet along the path of a vehicle having a velocity of 600 feet per second, the filter is designed to pass energy having a frequency of 1 cycle per second.

Upon the occurrence of the on-range condition, the positive unidirectional potential on the grid of tube 54 decreases to a low value which is accentuated by the negative bias impressed on tube 54 by bias potential source C. An amplified positive wave potential is created at the anode of tube 54 and is impressed on thyratron switch tube 22. The thyratron normally is biassed sufficiently negative to prevent accidental firing. Upon the occurrence of the on-range condition, the high amplitude positive wave potential impressed on the thyratron grid causes it to ignite and energize a convenient form of indicator or vehicle control device.

The occurrence of the on-range condition is indicated by indicator 24 coupled with the inter-electrode space of the thyratron. It is apparent that any other type of indicator alarm or control device, either current or potential responsive, may be used in an obvious manner to respond to the sudden flow of current through the switch tube circuit.

Although this application shows and describes a specific embodiment of the invention, other modifications are possible. The invention, therefore, is to be restricted only by the spirit thereof and the scope of the prior art.

What is claimed is:

1. In a radio ranging device, a first super-regenerative oscillator, a second regenerative oscillator and means for activating said oscillators in alternate sequence with the activation of the second oscillator following the activation of the first oscillator with an intervening time interval equal to approximately twice the selected ranging distance divided by the velocity of light; radiating means coupled to said first oscillator and receiving means coupled to said second oscillator, said second oscillator during its activation being adapted to generate noise energy in the absence of the receipt of reflected energy from said first oscillator; a rectifier coupled to said second oscillator to rectify the noise energy generated therein whereby a unidirectional potential is created by the second oscillator when the intervening distance btween the ranging dvice and a reflecting object is other than the selected ranging distance.

2. In a radio ranging device, a first super-regenerative oscillator, a second super-regenerative oscillator and an indicator, said first super-regenerative oscillator having spaced periods of oscillation and said second super-regenerative oscillator having periods of oscillation spaced in time from the periods of oscillation of the first super-regenerative oscillator by ranging interval, said second super-regenerative oscillator having the characteristic such that its periods of oscillation become regular in occurrence and duration upon the impression upon said circuit of energy of proper phase, antenna means connected to each oscillator to couple the same with a transmission medium whereby energy is adapted to be radiated by said first oscillator during its oscillation periods toward a reflecting object and said second oscillator is adapted to receive said energy when reflected from an object, means for coupling said indicator to said second oscillator whereby the indicator is adapted to indicate the occurrence of regularity of the periods of oscillation of the second oscillator to thereby indicate the presence of said reflecting object at a distance equal to one half the product of the ranging distance times the velocity of light.

3. In a radio ranging device, a first super-regenerative circuit having alternate phases of wave energy sending and quiescence, a second super-regenerative circuit having alternate phases of wave energy sensing and quiescence; said phases of wave energy sensing lagging the phases of wave energy sending by a time interval equal approximately to twice the selected ranging distance divided by the velocity of light; said second super-regenerative circuit being adapted to generate wave energy at unequal intervals during the wave energy sensing phase in the absence of impinging energy of proper phase and to generate wave energy at equal intervals in the presence of impinging energy of proper phase; a rectifier, and means for coupling said rectifier to said second super-regenerative circuit whereby a unidirectional potential is created during the sensing phase by said rectifier in the absence of the receipt of energy generated by said first super-regenerative circuit as reflected from an object at the selected ranging distance.

4. A radio ranging device comprising means adapted to radiate wave energy of a selected frequency; means adapted to receive wave energy of the same selected frequency, means for rendering said radiating and said receiving means normally quiescent, modulator means for activating said radiating means for short intervals with a spacing between activations longer in time than twice the ranging distance divided by the velocity of light, means for activating said receiving means with the same sequence of activations but with a time lag with respect to the activations of the radiating means equal to approximately twice the ranging distance divided by the velocity of light; said receiving means being adapted to generate noise energy in the absence of the receipt of said radiated energy reflected from an object at the ranging distance and adapted to reduce said noise energy generation under the condition of receipt of said radiated energy reflected from an object at the selected ranging distance; means for rectifying said noise energy to thereby create a unidirectional potential and means responsive to the reduction of said potential for giving an indication of the on-range condition.

5. In a radio ranging device, a transmitter adapted to radiate short periods of radiant energy at spaced intervals, a super-regenerative sensing oscillator, means for rendering said sensing oscillator normally quiescent, means for activating said sensing oscillator for short periods subsequent to the radiation periods of the transmitter by an interval of time equal to twice a selected ranging distance divided by the velocity of light, said sensing oscillator being adapted normally to generate noise energy and to decrease the generation of noise energy under the condition that transmitter energy is reflected and received by said sensing oscillator during the activation thereof, whereby a decrease in noise energy generation by said sensing oscillator is an indication of the occurrence of the selected ranging distance between the device and a reflecting object.

6. In a radio ranging device, a transmitter adapted to radiate short periods of radiant energy at spaced intervals, a super-regenerative sensing oscillator, means for rendering said sensing oscillator normally quiescent, adjustable means for activating said sensing oscillator for short periods subsequent to an adjustable interval after the radiation periods of the transmitter by an interval of time equal to twice a selected ranging distance divided by the velocity of light, said sensing oscillator being adapted normally to generate noise energy and to decrease the generation of noise energy under the condition that transmitter energy is reflected and received by said sensing oscillator during the activation thereof, whereby a decrease in noise energy generation by said sensing oscillator is an indication of the occurrence of the selected ranging distance between the device and a reflecting object.

7. In a radio ranging device, a first super-regenerative oscillator, a second super-regenerative oscillator, and means for activating said oscillators in alternate sequence with activation of the second oscillator following the activation of the first oscillator with an intervening time interval equal to approximately twice the selected ranging distance divided by the velocity of light, radiating means coupled to said first oscillator and receiving means coupled to said second oscillator, said second oscillator during its activation being adapted to generate noise energy in the absence of the receipt of reflected energy generated by said first oscillator; a rectifier; a filter having a no-pass characteristic for energy having a frequency equal to the sum of the activations per second, said filter coupling said rectifier to said second oscillator whereby a unidirectional potential is created responsive to only the noise energy generated by the second oscillator under the condition that the intervening distance between the ranging device and a reflecting object is other than the selected ranging distance.

8. In a radio ranging device, a transmitter adapted to radiate short pulses of radiant energy at spaced intervals, a super-regenerative sensing oscillator, means for rendering said sensing oscillator normally quiescent, means for activating said sensing oscillator for short periods subsequent to the radiation periods of the transmitter for an interval of time equal to twice the selected range divided by the velocity of light, said sensing oscillator being adapted normally to generate noise energy and to decrease the generation of noise energy upon the occurrence of that distance between the device and a reflecting object which causes the energy generated by said transmitter to be reflected and received by the sensing oscillator during the activation thereof; means for translating said decrease of noise energy into an electrical quantity; an electrical quantity responsive switch; an indicator, said switch coupling the indicator to said translating means whereby said indicator is responsive to the occurrence of said ranging distance.

9. In a radio ranging device, a multi-vibrator of the cross-coupled grid anode type, a first super-regenerative oscillator and a second super-regenerative oscillator, said first and second super-regenerative oscillators each having an antenna, means for differentiating the pulses generated at each anode of said multi-vibrator, means for inverting and amplifying the negative components of the differentiated pulses whereby pairs of positive pulses are generated having a time spacing equal to the shorter time constant of the multi-vibrator, means for impressing the positive pulses derived from one anode of the multi-vibrator to said first super-regenerative oscillator and means for impressing the positive pulses derived from the second anode of the multi-vibrator on the second super-regenerative oscillator being adapted normally to generate noise energy when activated and having the characteristic that the noise energy diminishes under the condition of the receipt of energy emitted by the first super-regenerative oscillator when received during the activation period whereby a reduction in noise energy generation is an indication of the presence of a reflecting object at a distance equal to the velocity of light times one half the shorter time constant of the multi-vibrator.

10. In a radio ranging device, an assymmetrical multi-vibrator of the cross-coupled grid anode type having an adjustable short time constant, a first super-regenerative oscillator and a second super-regenerative oscillator, said first and second super-regenerative oscillators each having an antenna, means for differentiating the pulses generated at each anode of said multi-vibrator, means for inverting and amplifying the negative components of the differentiated pulses whereby pairs of positive pulses are generated having a time spacing equal to the shorter time constant of the multi-vibrator, means for impressing the positive pulses derived from one anode of the multi-vibrator to said first super-regenerative oscillator and means for impressing the positive pulses derived from the second anode of the multi-vibrator on the second super-regenerative oscillator for activating the same, said second super-regenerative oscillator being adapted normally to generate noise energy when activated and having the characteristic that the noise energy diminishes under the condition of the receipt of energy emitted by the first super-regenerative oscillator when received during the activation period whereby a reduction in noise energy generation is an indication of the presence of a reflecting object at a distance equal to the velocity of light times one half the shorter time constant of the multi-vibrator, and whereby the distance at which said indication occurs can be adjustably selected by adjusting the short time constant of the multi-vibrator.

References Cited in the file of this patent

UNITED STATES PATENTS

| | | |
|---|---|---|
| 2,193,868 | Geiger | Mar. 19, 1940 |
| 2,406,316 | Blumlein et al. | Aug. 27, 1946 |
| 2,422,382 | Winchel | June 17, 1947 |
| 2,431,344 | Reeves | Nov. 25, 1947 |

FOREIGN PATENTS

| | | |
|---|---|---|
| 581,168 | Great Britain | Oct. 3, 1946 |
| 581,982 | Great Britain | Oct. 31, 1946 |